United States Patent [19]

Campbell

[11] 4,364,710
[45] Dec. 21, 1982

[54] VERTICAL-AXIS WINDMILL OF THE CHINESE TYPE

[76] Inventor: James Campbell, 74 Sleepy Hollow La., Orinda, Calif. 94563

[21] Appl. No.: 101,114

[22] Filed: Dec. 7, 1979

[51] Int. Cl.³ .............................................. F03D 11/04
[52] U.S. Cl. .................................. 416/142; 416/119; 416/DIG. 6
[58] Field of Search ............... 416/142 B, 119, 140 R, 416/DIG. 6

[56] References Cited

U.S. PATENT DOCUMENTS

| | | | |
|---|---|---|---|
| 226,357 | 4/1880 | Saccone | 416/140 X |
| 375,378 | 12/1887 | Perry | 416/142 B X |
| 431,991 | 7/1890 | Perry | 416/142 B X |
| 457,273 | 8/1891 | Hall | 416/111 |
| 457,384 | 8/1891 | Stoner | 416/142 B X |
| 460,837 | 10/1891 | Addis | 52/120 |
| 505,784 | 9/1893 | Bailey | 416/119 |
| 546,185 | 9/1895 | Park | 416/119 |
| 588,143 | 8/1897 | Hall | 416/111 |
| 717,916 | 1/1903 | Perry | 416/142 B X |
| 773,976 | 11/1904 | Moraleda | 416/140 X |
| 1,139,103 | 5/1915 | Clade | 416/119 |
| 1,511,965 | 10/1924 | Hennigh | 416/119 X |
| 2,119,142 | 5/1938 | Shenk | 416/119 X |
| 2,267,705 | 12/1941 | Athy | 52/120 |
| 2,843,229 | 7/1958 | Woolslayer et al. | 52/120 |
| 3,803,780 | 4/1974 | Donnally | 52/120 X |
| 4,101,244 | 7/1978 | Grotberg | 416/119 |
| 4,197,055 | 4/1980 | Campbell | 416/140 X |
| 4,221,088 | 9/1980 | Patterson | 52/116 |

FOREIGN PATENT DOCUMENTS

| | | | |
|---|---|---|---|
| 735210 | 5/1943 | Fed. Rep. of Germany | 416/142 B |
| 845180 | 7/1952 | Fed. Rep. of Germany | 416/142 B |
| 1075772 | 10/1954 | France | 416/119 |

Primary Examiner—Everette A. Powell, Jr.
Attorney, Agent, or Firm—Merwyn G. Brosler

[57] ABSTRACT

A vertical-axis windmill comprising a central pole having a longitudinal axis about which a plurality of sales may revolve as would the main sails of three sailing boats restricted to follow a horizontal circular course and including means for lowering the windmill for protection or service without the sails engaging the ground.

1 Claim, 12 Drawing Figures

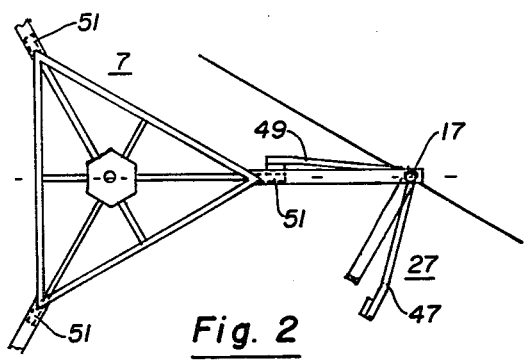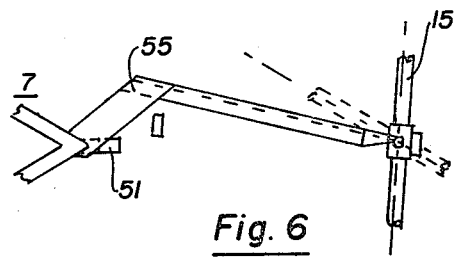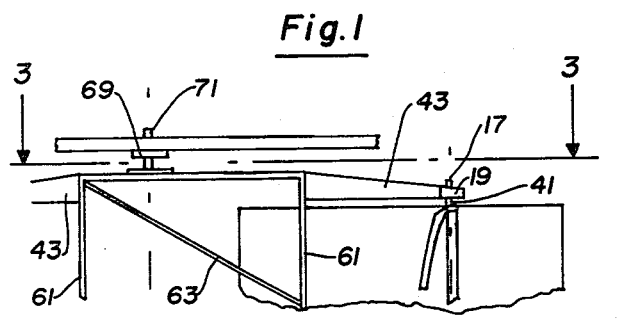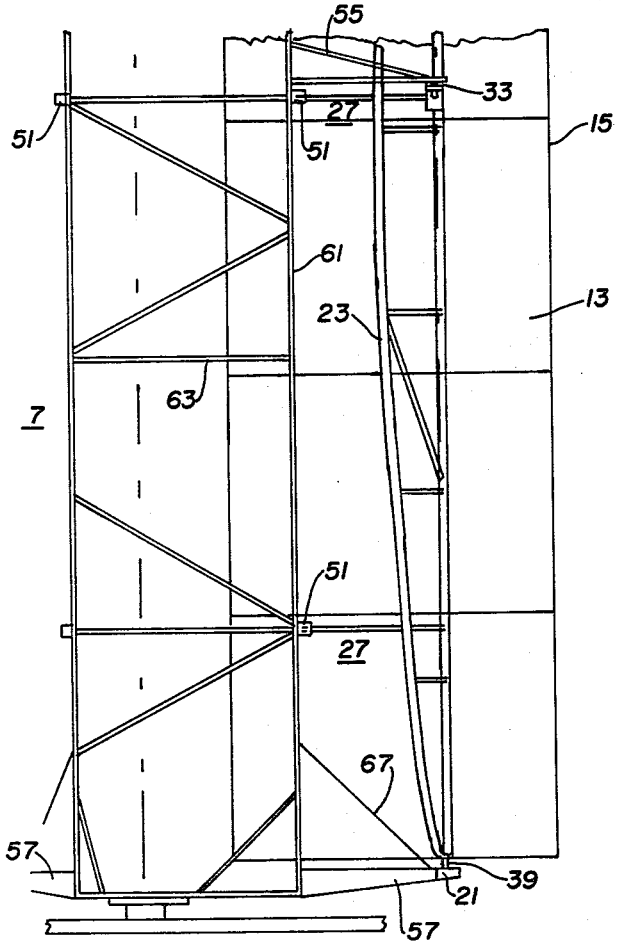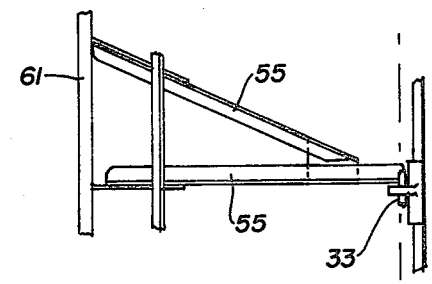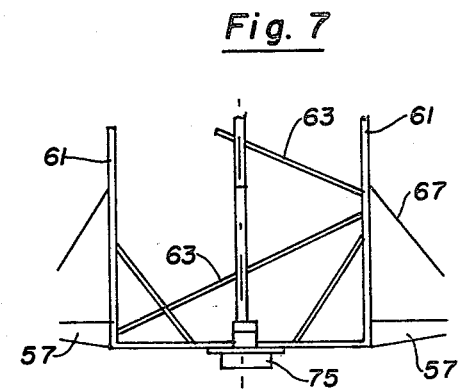

VERTICAL-AXIS WINDMILL OF THE CHINESE TYPE

My invention relates to windmills and particularly to a Chinese type vertical-axis windmill which is an improvement over that illustrated and disclosed in my earlier patent application for a vertical axis windmill filed Nov. 28, 1977 and given Ser. No. 855,223.

These improvements came about as a result of continued design and experimentation in an effort to produce a vertical-axis windmill of adequate size to produce the necessary power output for use in a home. The new features disclosed result from an effort to provide an intercepted wind area large enough for normal commercial or home use and had to take into account restricted ground area for installation while assuming an unlimited upper height. An optimum height/width ratio of seven has now been adopted as very favorable toward this end. However, increasing this height/width ratio was accompanied by structural problems which had to be overcome and resulted in many of the features of this invention.

Included among these features are a new triangular central shaft structure for providing light weight support for the increased height; a means for providing bearing support for the sails midway between their ends to overcome bowing problems inherent in a tall sail in a strong wind; and a means for laying the entire windmill assembly parallel to the ground for maintenance or protection in event of extremely high destructive winds.

Among the objects of my invention are:

(1) To provide a novel and improved vertical-axis windmill;

(2) To provide a novel and improved central shaft structure for a vertical-axis windmill that is light in weight and will still provide the necessary strength to rotatably support sails;

(3) To provide a novel and improved vertical-axis windmill having a tilt-down feature for protection and servicing;

(4) To provide a novel and improved multiple bearing means for supporting tall sails.

Additional objects of my invention will be brought out in the following description of a preferred embodiment of the sane, taken in conjunction with accompanying drawings, wherein FIG. 1 is a front view in elevation of the windmill depicting the central supporting structure and a sail assembly;

FIG. 2 is a view through plane 2—2 of FIG. 1 depicting the triangular support structure;

FIG. 5 is a view in elevation of the mid-height support bearing assembly;

FIG. 6 is a top view of the mid-height support bearing assembly of FIG. 5;

FIG. 7 is a view in elevation of base portion of the triangular support structure;

Figure 11:
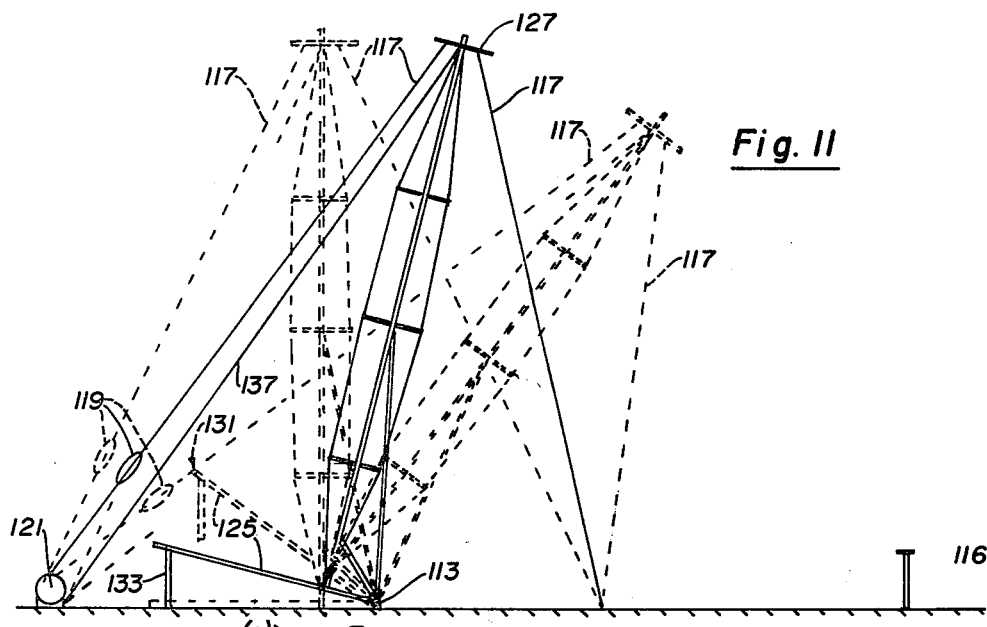
FIG. 11 is a view depicting the vertical and intermediate tilt positions of the windmill support structure of FIG. 8.
Figure 3:
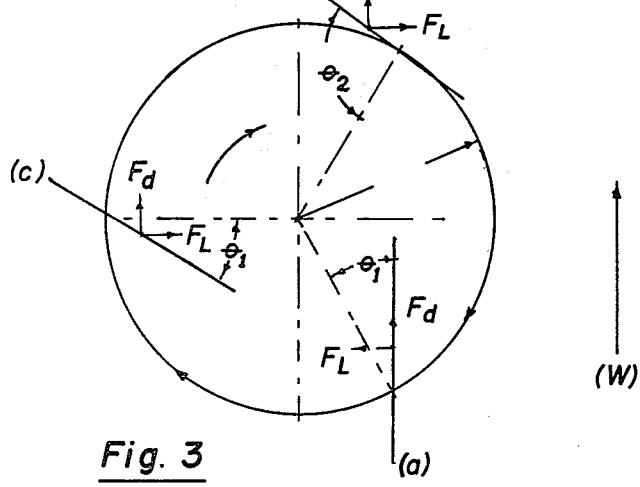
FIG. 3 is a diagramatic view of the functioning sails of the windmill of FIG. 1.

Referring to the drawings for details of my invention in its preferred form, the same comprises three sail assemblies radially supported from a triangular rotatable central shaft structure 7. In operation, each sail continually repeats the following cycle; tack on the up-wind side, run with the wind, jibe, tack on the downwind side and luff. This operation is performed by the sail on its own axis while imparting a turning moment to the central shaft. The operation is further illustrated in FIGS. 3 and 4 which depict the top view of the windmill in two different operating positions wherein at sail position (a) it has just finished luffing and is parallel to the wind direction W. After a slight rotation of the windmill, the sail surface, at position (b), is held at angle $\theta_1$ which will then be at a small angle from the direction of the wind.

The force exerted by the wind is uniformly distributed over the entire sail surface and can be replaced by a single concentrated force located at the center of the sail. This single force is the resultant of two force components, one parallel to the wind direction, $F_d$, known as the drag component, and one perpendicular to the wind direction, $F_L$, known as the lift force component. In position (a) the drag component exerts a negative moment and the lift component exerts a positive moment about the windmill axis. Similar moments exists at other rotational positions except that the signs, negative or positive, may differ. The sum of the moments in the direction of rotation are positive and will always exceed the negative moments in the opposing direction.

The sail surface remains at angle $\theta_1$ from the end of luffing at position (a) to jibing at position (d). From slightly beyond jibing at position (d) to beginning of luffing, slightly beyond position (e), the sail surface remains at angle $\theta_2$. Both angles $\theta_1$ and $\theta_2$ are measured from a radial line joining the windmill vertical axis and the sail pivot axis and were previously experimentally determined to be optimum at 30 degrees and 95 degrees respectively.

Figure 4:
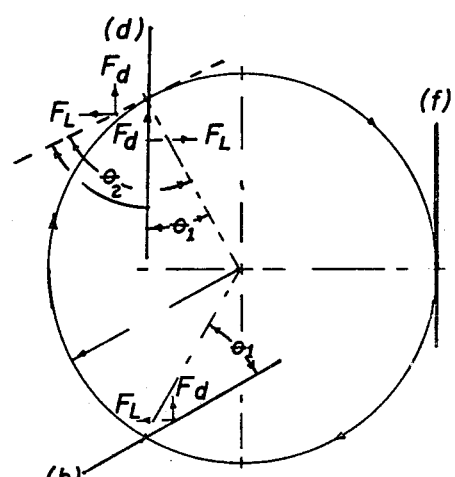
FIG. 4 is a diagramatic view of the functioning sails of the windmill of FIG. 1.
Figure 12:
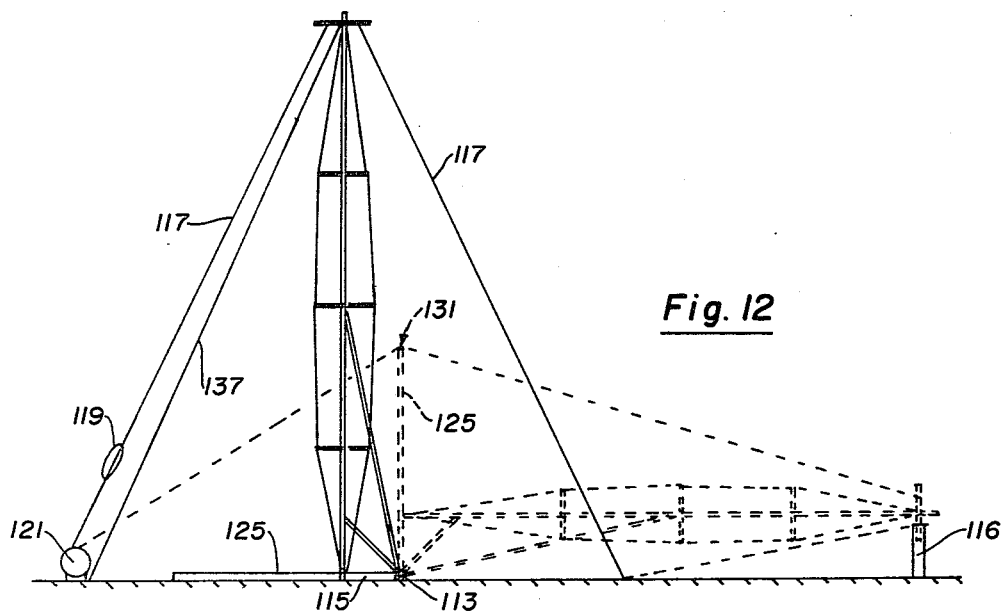
FIG. 12 is a view depicting the vertical and horizontal position of the support structure of FIG. 8.
Figure 9:
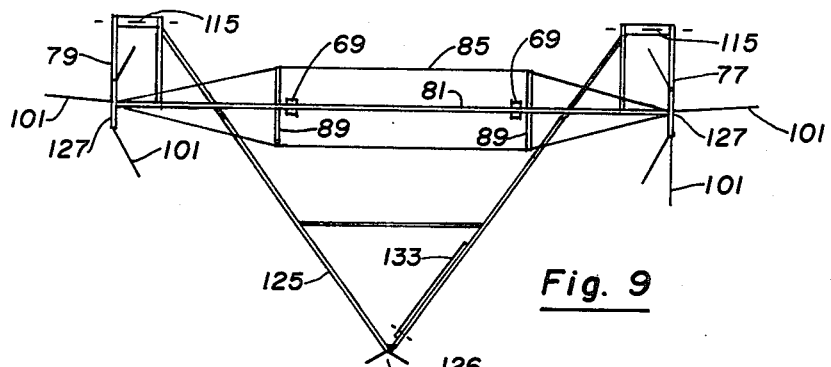
FIG. 9 is a plan view of the windmill support structure of FIG. 8.

It should also be noted that in FIG. 4, sail position (d) shows one sail jibing and the sail which follows it acting as a shield to the windward of the jibing. The sail which follows reduces the wind velocity so that jibing occurs smoothly and gently; this is important because jibing usually occurs with considerable slaming and jarring. It is an important advantage of this type of windmill when it has three sails.

The sails perform the principle function of securing energy from the wind and therefore may be called the heart of the system. All other elements have functions which, directly or indirectly support these sail functions.

The sail is basically the same as that of my previous application in that it is a flat sheet of fabric 13 laced to a rectangular aluminum frame 15. The important sail features include the sail offset pivot axis 17, the upper and lower bearings 19, 21, the strength reinforcing truss 23 and the sail stop arm assemblies 27. The important improvements over the prior sails include a mid-height bearing 33, a new height/width ratio of 7, and the fact that there are now three sets of stop arm assemblies, an upper, a middle, and a lower. The lower sail bearing journal 39 is a stainless steel bar with a smooth rounded lower end which serves as a thrust bearing to support the weight of the sail. The upper sail bearing journal 41 is a smooth stainless steel tube sufficiently long to prevent disengagement from an upper sail support arm 43 during operation.

A stop arm assembly comprises a pair of radial arms 47, 49 affixed to the sail strength reinforcing truss 23 and rotatable therewith in such a position as to limit rotation of the sail in one direction at the angle $\theta_1$ and to limit rotation of the sail in the opposite direction at the angle $\theta_2$. This limitation results when the ends of the angular arms contact a stop pad 51 permanently affixed to the central vertical shaft assembly.

Because of the large height/width ratio and the vertical flexibility inherent therewith, it was found that a mid-height bearing support was necessary to prevent sail damage caused by high centrifugal forces occasioned by extra high windmill rotational velocities.

Because the sails are limited to pivoting within an angle of 65 degrees and because the sail pivot axis is located slightly offset from the central bar of the sail strength reinforcing truss 23, the mid-height bearing 33 can easily be secured in alignment with the upper and lower bearing points without weakening the sail. Also, a support arm 55 from the central vertical shaft structure 7 may reach this bearing to provide support through part of the angle not traversed by the sail in its rotation. Any number of these mid-sail support arms may be included as necessary depedent upon the height/width ratio of the sail.

The sail supporting points are located in the outer ends of the upper 43, mid-height 55 and lower 57 sail support arms which extend radially outward horizontally as part of the central vertical shaft assembly. The shaft assembly comprises three vertical steel members 61 triangularly aligned and positioned parallel and at equal distances from the axis of the central shaft structure and are held in position by a plurality of structural ribs and braces 63. These vertical members are located just inside the locations where the rubber stop pads 51 that contact and limit rotation of the sail stop arms 27 must be located, and there the members provide excellent support for such stop pads.

Since the sail lower support arms 57 support the sails total weight they are dessigned to be stronger and are provided with an additional brace 67. The upper bearing 69 for the central shaft structure is similar to the upper bearings for the sail and include a stainless steel journal 71 sufficiently long to insure against accidental slippage out of its bearing in the upper connecting structure. Bolted to the bottom of the central shaft assembly, a simple half coupling 75 fits vertically on its complimentary half which may be securely fastened to the top of a large gear shaft (not shown).

Figure 8:
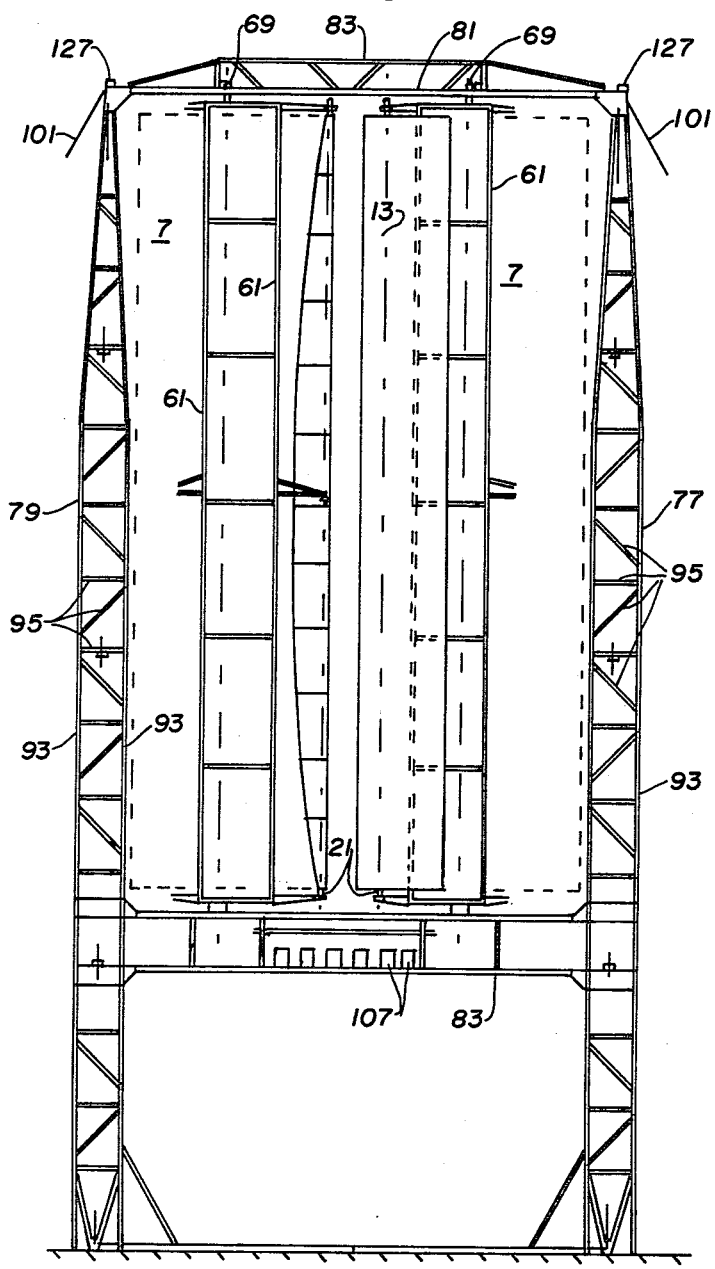
FIG. 8 is a front view in elevation of the windmill support structure supporting two windmill assemblies.
Figure 10:
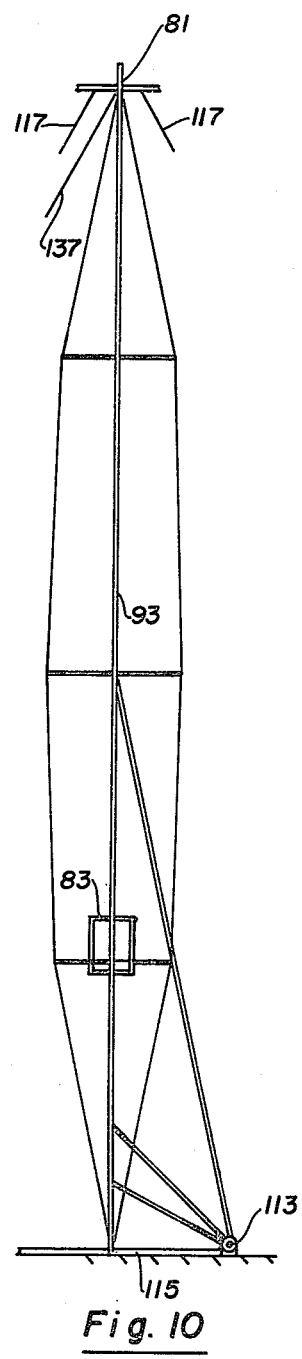
FIG. 10 is a side view of the windmill support structure of FIG. 8.

Thus it can be seen that a basic windmill consists of a central shaft assembly with three sails assembled on its sail support arms. To enable it to be useful, the basic windmill requires proper support which in the preferred embodiment is provided by a supporting structure as described herein. The structure selected is for the containment of two basic windmills and consist of two masts 77, 79, an upper horizontal connecting structure 81 and a lower horizontal connecting structure 83. The two basic windmills are supported inside the rectangle formed by the components of this structure (FIG. 8). The upper connecting structure ends are bolted to the tops of the two masts and provide support in the proper position for the upper bearings 69 of the two basic windmills.

The structure consists of a truss 83 in which all the steel members in the weldment are located in a vertical plane to give the structure adequate vertical strength. To obtain strength horizontally for the upper bearings of the two basic windmills, two wire ropes are employed 85, 87, one in front and the other at the rear, connecting both ends of the upper connecting structure. The wire ropes are securely fastened to the ends of the structure and in between are held outwardly in the horizontal plane by suitable steel struts 89. Turnbuckles are employed for properly tensioning these two wire ropes and since they are located at a relatively large distance from the neutral axis of the beam, the welded structure can be given ample bending strength by these ropes. Larger distance from the structure neutral axis to the wire ropes provide even further bending strength.

The two masts 77, 79 are the vertical structures forming the sides of the rectangle formed by the windmill supporting structure and which comprise a pair of spaced vertical flat steel rods 93 separated and connected by steel bracing members 95. The wire rope feature as described above for the upper connecting structure is used again here. The wire ropes are attached at the top and bottom of the structure and held outwardly in this case in a vertical plane by suitable steel struts. This use of wire rope as a weight reduction feature has proved highly effective in both the vertical masts and the upper connecting structure.

To obtain necessary support at the front, side and the rear of the supporting structure, guy wire ropes 101 are securely fastened to the top of each mast and anchored to the ground at some distance to the front, rear and sides of the supporting structure.

The lower connecting structure 83 extends horizontally between the two masts and is bolted thereto. This structure contains the power transmission gears and shafting and also the alternators 107 which generate electricity as well as supporting the weight of the two windmills. It is comprised of a sufficiently heavy steel rectangular fabricated structure which includes on its top two windmill half couplings to mate with the complimentary half coupling 75 on the lower end of the sail triangular shaft assembly. Both windmills may be connected internally of the fabricated structure through appropriate gearing and drive mechanism to provide power for the generators.

With this larger size windmill, assembly and maintenance on the upper parts thereof is more easily performed when the windmill is down, or in a horizontal position. Also, a horizontal position is desirable to protect the windmill during strong and dstructive wind storms. For this reason, a single windmill may be designed, or as in the preferred embodiment where the supporting structure has been designed, that it may easily be tilted from either its up or operating position to a down or accessible and protective position.

The relatively planer rectangular shape of the complete windmill is especially suitable for such a tilting feature. Since the sails extend outward from the center plane of the supporting structure, in its horizontal down position the center plane must be above ground level at least the distance of this extension so the sails do not strike the ground and become damaged. For this reason, mast tilting bearings 113 are offset in the direction of windmill lowering and are located on offset structures 115 which are bolted to the lower portions of the two masts and are level with the bottom ends of the masts when the masts are in their upright position.

The tilting operation for the windmill is accomplished with the use of wire ropes 117, pulleys 119, a front reel assembly 121, a rear reel assembly (not shown) and an A-frame gin-pole 125. Wire ropes used for the tilting operation serve also as guy-wire ropes when the windmill is in its upright position. Bolted normal to the top of each mast an extension bar 127 projects outward toward both front and rear for the attachment of the raising and lowering wire ropes 117 which would otherwise intersect the plane of the sails. The raising and lowering wire ropes extending to the front are brought together and joined to one larger diameter wire rope which is brought to the reel 121 for winding thereon in the front of the windmill assembly. A similar arrangement is repeated to the rear of the windmill assembly where the reel is not shown.

The A-frame gin-pole 125 is normal to the windmill assembly and extends at ground level toward the reel in front of the windmill assembly and when rotating upward contacts the single wire rope within a groove 126 at its apex at a point 131 on the rope just short of the intersection with the two wire ropes to the mast. Just to the front of the contact location with the A-frame gin pole, the wire rope is connected to a 2-sheeve block 119 to reduce the tension in the wire rope to one fourth of the total force needed to raise the completed windmill assembly. Thus, with the gearing within the reel and a large crank, one man can alone operate the reel to lower the windmill assembly or a motor drive may be installed with suitable controls. When the windmill is down and the gin-pole is upright, the pole provides the necessary leverage during the first portion of the windmill raising. A longer or higher gin-pole will result in less force needed at the start of windmill raising.

Posts 116 are provided to the rear of the supporting structure in alignment with the masts to provide support for the downed windmill assembly so the sails will not contact with the ground.

The rear reel also has a large prewound spiral spring which automatically reels in slack wire rope. It is conveniently located to one side and thus is not beneath the sails when the windmill is down.

In rotating the windmill about the offset pivot 113 a balanced position occurs when the center of mass is located directly above this point. From this balanced position which will be reached while either raising or lowering the windmill, the windmill must be urged in the direction in which it must continue. It also has the ability in this position to fall to an upright or a down position. Consequently, when raising the windmill by winding cable upon the front reel, the windmill must be restrained by cable from the rear reel from falling past this position and becoming damaged. When lowering the windmill it is necessary first to wind on the rear cable to bring the windmill to its balanced position and thereafter restrain its fall by maintaining tension on the front cable.

Some safety features have been provided to stop the windmill at this balanced position which helps in the raising and lowering of the windmill assembly. A safety gauge rod 133 is rotatably fastened to the outer end of the A-frame gin pole so that it can pivot freely downward and vertically engage the ground when the windmill is in its balanced position. Thus, when raising the windmill with the safety gauge rod hanging freely, the free end of the rod reaches ground level as the windmill reaches the balanced position and prevents the windmill from tilting further upright and falling to its vertical position. A safety guy wire rope 137 has been added and is fastened in the front at the top of one mast and removably anchored to a location directly in front of the mast. This safety guy wire rope may preform two different functions, (1) it may be fastened at the fitting where it functions as a guy wire rope while the windmill is up and operating, and (2) it may be fastened at another fitting where it limits the tilting of the windmill when the windmill is tilted slightly to the rear of the balanced position. In an nonfunctioning position it may be disconnected and allowed to hang freely when the windmill is down, and for this reason a quick release device is provided.

From the foregoing description of my invention in its preferred form, it will become apparent that the same is subject to alteration and modification without departing from the underlying principles involved and I do not desire to be limited in my protection to the specific details illustrated and described except as may be necessitated by the appended claims.

I claim:

1. A windmill comprising a support for sails including a central support structure having a ground engageable end, at least one sail supported by said central structure, means for downwardly rotating said support structure for lowering said windmill without engagement of said sail with ground, a front cable secured from ground to the upper portion of said central support structure, a gin-pole secured normal to said ground engageable end of said central support structure and extending in alignment with said front cable such that when said windmill is rotated, in a lowering direction, said gin-pole will rotate upward and contact said front cable to maintain said front cable in an elevated position to provide leverage for assisting in lowering and subsequently in raising of said windmill, said ground engageable end of said central support structure secured upon a rotatable base with said rotatable base including a pivot behind said windmill, said windmill characterized by having a balance position when its center of mass is rotated, during raising, to a position directly above said offset pivot, a safety gauge rod rotatably hanging freely from said gin-pole to engage the ground upon raising of said windmill to prevent said windmill from falling from said balance position to an upright position.

* * * * *